J. M. A. BRUN & G. M. DAURIS.
POT FOR COLLECTING RESIN.
APPLICATION FILED MAR. 11, 1912.
1,084,840.
Patented Jan. 20, 1914.
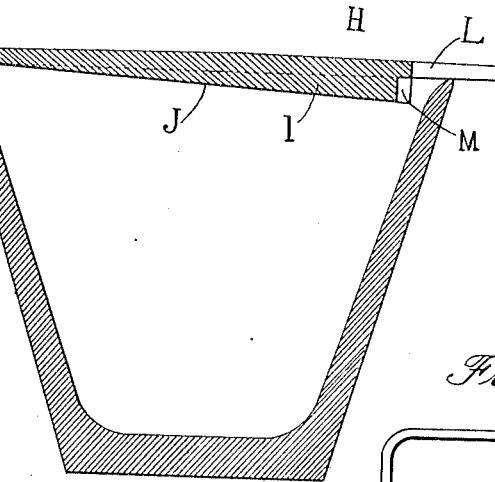
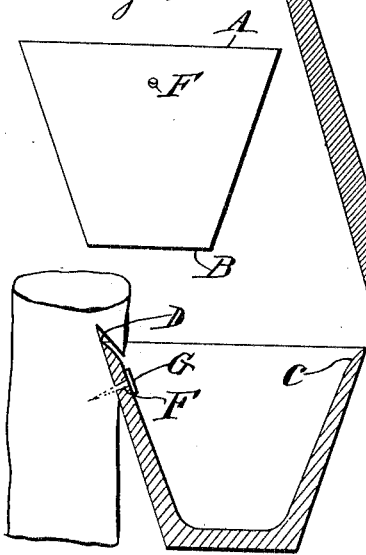
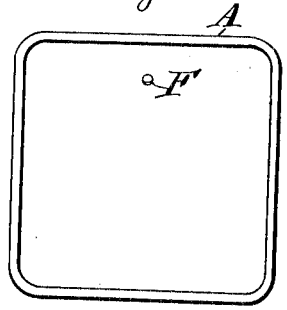
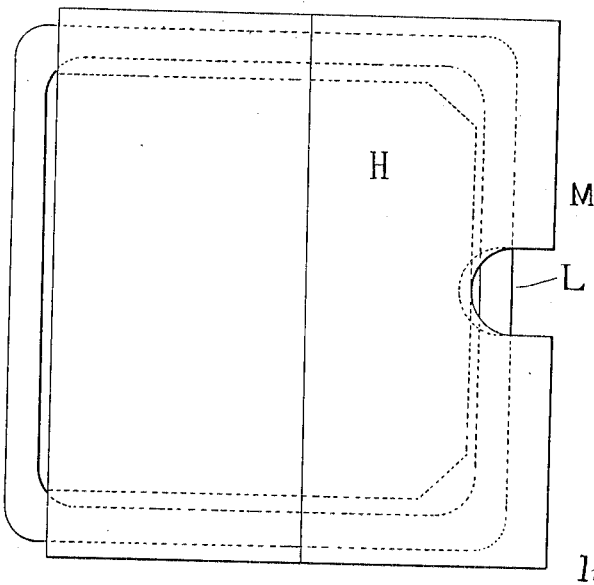
Witnesses
L. Anger
C. A. Walter
Inventors
Jean Marie Albert Brun & Gaston Marc Dauris
by
Attorney

UNITED STATES PATENT OFFICE.

JEAN MARIE ALBERT BRUN, OF SALLES, AND GASTON MARC DAURIS, OF MIOS, FRANCE.

POT FOR COLLECTING RESIN.

1,084,840. Specification of Letters Patent. Patented Jan. 20, 1914.

Application filed March 11, 1912. Serial No. 682,886.

*To all whom it may concern:*

Be it known that we, JEAN MARIE ALBERT BRUN and GASTON MARC DAURIS, citizens of the French Republic, residing, respectively, at Salles and Mios, both in Gironde, in France, have invented a certain new and useful Improvement in Pots for Collecting Resin, of which the following is a specification.

This invention relates to a pot for collecting resin, rubber or the like from resin producing trees.

The pot is characterized by its special shape and by means of allowing the usual collecting sheet or funnel of metal to be dispensed with.

Figure 1 illustrates the pot in elevation. Fig. 2 shows it in plan. Fig. 3 illustrates it in section and shows it placed in position on a tree. Fig. 4 is a section on an enlarged scale of the pot with its cover. Fig. 5 is a plan.

The pot is in the shape of a truncated cone rectangular at its upper part A and of circular shape at its base B. The edges of the upper part of the pot are beveled on the inside as at C, so as to produce a thin edge in order that the side of the pot applied against the tree can engage in the notch D. Each face of the pot may be provided with a hole F flared toward the inside of the pot and intended for the reception of a pin or spike G for suspending the pot on the tree, it could also be suspended like the known pots by a pin placed underneath.

The pot may be made of earthenware or any other suitable material.

As the rim of the pot is formed straight it has a relatively greater length of contact with the tree.

By dispensing with the feeder spout the use of the pot is cheaper and it can be more rapidly placed in position than those hitherto used, and owing to the facility with which it can be displaced it can be removed when the degree of hardness of the resin increases so that a superior resin can be collected by lessening the loss resulting from drying.

The pot is provided with a cover which is advantageous in the collection of resin.

The underside of the cover H has a projecting portion I penetrating into the pot and the slope J of this projection gives it a progressive increasing contact surface with the contents of the pot directly the level of the contents reaches the lowest part of the underside of the cover.

The outlet of the water in excess is allowed for as follows: The edge of the cover has a notch L extending for a short distance M into the projection or it may be made in the thickness of the cover. The upper plane of the cover is parallel with the plane of the bottom of the pot. The notch may be replaced by a conduit in the form of an arch made in the thickness of the cover. The cover lies on the pot so as to leave an opening on the side where a straight edge engages in the tree notch. Rain water flowing therein and against the upper inclined part of the cover will be thus collected and as the water rises in the pot, the light gum which floats will come in contact with the inclined face of the cover with which it remains in contact while the water continuing to rise will flow slowly over the edge of the pot. The adherence of the gum under the cover is sufficient to prevent it being carried out by the water.

The top of the cover may be equally divided to slope toward the point of arrival K of the resin, in order that the resin that flows in can only pass into the pot. The displacement of the cover may be prevented by means of a pin engaging into the pot.

The cover may be made of earthenware or any other material, and may be applied to pots other than that for which it is particularly intended. It could also have its faces parallel and carry underneath on the side of the notch a rectilinear or curved partition, which would retain the resin.

What we claim as our invention and desire to secure by Letters Patent of the United States is:—

1. A pot for collecting resin having a rim comprising rectilinear portions, said portions being beveled to form sharpened lips, any one of which is adapted to engage in a notch made in the gum tree, and a rounded bottom and orifices in its sides adapted for the passage of a pin for suspending the pot, a lid, and means on said lid to retain the resin, the said lid being provided with orifices allowing the resin to flow in and the water to flow out of said pot.

2. A pot for collecting resin having a rim comprising rectilinear portions, said portions being beveled to form sharpened lips, any one of which is adapted to engage in a notch made in the gum tree, and a rounded bottom and orifices in its sides adapted for the passage of a pin for suspending the pot, a lid, a downward projection on said lid adapted to form a progressive surface of contact with the contents of the pot, said lid having a notch on one side for the outflow of water and leaving a space on the other for the inlet of the resin.

3. A pot for collecting resin having a rim comprising rectilinear portions, said portions being beveled to form sharpened lips, any one of which is adapted to engage in a notch made in the gum tree, and a rounded bottom and orifices in its sides adapted for the passage of a pin for suspending the pot, a lid, a partition on the under side of said lid adapted to retain the resin, said lid having inlet and outlet orifices for the inlet of the resin and outflow of water.

In witness whereof we have signed this specification in the presence of two witnesses.

JEAN MARIE ALBERT BRUN.
GASTON MARC DAURIS.

Witnesses:
M. TAILLERF,
HENRY PHILLIPS.

Copies of this patent may be obtained for five cents each, by addressing the "Commissioner of Patents, Washington, D. C."